(12) United States Patent
Jubin et al.

(10) Patent No.: US 6,939,005 B2
(45) Date of Patent: Sep. 6, 2005

(54) ROTATIONALLY STABILIZED CONTACT LENSES

(75) Inventors: Philippe F. Jubin, Jacksonville, FL (US); Susan W. Neadle, Jacksonville, FL (US); Sheila B. Hickson-Curran, Ponte Vedra Beach, FL (US); Timothy A. Clutterbuck, Jacksonville, FL (US); Matias Dieter Heinrich, Jacksonville, FL (US)

(73) Assignee: Johnson & Johnson Vision Care Inc., Jacksonville, FL (US)

( * ) Notice: Subject to any disclaimer, the term of this patent is extended or adjusted under 35 U.S.C. 154(b) by 0 days.

(21) Appl. No.: 10/644,638

(22) Filed: Aug. 20, 2003

(65) Prior Publication Data

US 2005/0041202 A1 Feb. 24, 2005

(51) Int. Cl.[7] ................................................. G02C 7/04
(52) U.S. Cl. ..................................... 351/160 H; 351/161
(58) Field of Search ......................... 351/160 H, 160 R, 351/161, 162, 177

(56) References Cited

U.S. PATENT DOCUMENTS

| | | | |
|---|---|---|---|
| 4,084,890 A | 4/1978 | Baron | |
| 4,095,878 A | 6/1978 | Fanti | |
| 4,573,774 A | 3/1986 | Sitterle | |
| 4,820,038 A | 4/1989 | Seger et al. | |
| 4,859,049 A | 8/1989 | Muller | |
| 5,020,898 A | 6/1991 | Townsley | |
| 5,100,225 A | 3/1992 | Rothe | |
| 5,532,768 A | 7/1996 | Onogi et al. | |
| 5,971,542 A | 10/1999 | Volker et al. | |
| 5,988,813 A | * 11/1999 | Neadle et al. | ............... 351/177 |
| 6,092,899 A | 7/2000 | Wanders | |
| 6,135,594 A | * 10/2000 | Windey et al. | ......... 351/160 H |
| 6,234,629 B1 | * 5/2001 | Neadle et al. | ............... 351/177 |
| 6,595,639 B1 | 7/2003 | Ho et al. | |
| 2002/0071094 A1 | 6/2002 | Roffman et al. | |

FOREIGN PATENT DOCUMENTS

| | | |
|---|---|---|
| EP | 440107 B1 | 8/1991 |
| EP | 741313 A2 | 11/1996 |
| EP | 745876 A2 | 12/1996 |
| EP | 980015 A1 | 2/2000 |
| EP | 1008890 A1 | 6/2000 |
| EP | 1014156 A1 | 6/2000 |
| GB | 2041557 A | 9/1980 |
| JP | 01187527 A | 7/1989 |
| JP | 11052304 A | 2/1999 |
| JP | 2000214417 A | 8/2000 |
| WO | WO 01/16641 A1 | 3/2001 |
| WO | WO 01/29608 A1 | 4/2001 |
| WO | WO 01/75509 A1 | 10/2001 |
| WO | WO 04/015480 A1 | 2/2004 |
| WO | WO 04/068214 A1 | 8/2004 |

OTHER PUBLICATIONS

PCT Search Report–Application PCT/US2004/022690 –Date of Mailing Nov. 16, 2004.

* cited by examiner

*Primary Examiner*—Scott J. Sugarman
(74) *Attorney, Agent, or Firm*—Lois Gianneschi

(57) ABSTRACT

The invention provides a lens in which the lens periphery is controlled as to each of thickness differential and both the rate of change from thinner to thicker regions and the shape of the transition from thinner to thicker regions within each of the dual thin zones. The lens of the invention substantially reduces the time for the lens' auto-positioning. Additionally, the lenses of the invention maintain their on-eye orientation better as compared to conventionally stabilized lenses.

25 Claims, 3 Drawing Sheets

ROTATIONALLY STABILIZED CONTACT LENSES

FIELD OF THE INVENTION

The invention relates to contact lenses. In particular, the invention provides rotationally stabilized contact lenses in which autopositioning and stabilization is improved.

BACKGROUND OF THE INVENTION

It is known that correction of certain optical defects can be accomplished by imparting non-spherical corrective characteristics to one or more surfaces of a contact lens such as cylindrical, bifocal, or multifocal characteristics. However, the use of these lenses is problematic in that the lens must be maintained at a specific orientation while on the eye to be effective. When the lens is first placed on-eye, it must automatically position, or auto-position, itself and then maintain that position over time. However, once the lens is positioned, it tends to rotate on the eye due to blinking as well as eyelid and tear fluid movement.

Maintenance of the on-eye orientation of a lens typically is accomplished by altering the mechanical characteristics of the lens. For example, prism stabilization, including without limitation decentering of the lens' front surface relative to the back surface, thickening of the inferior lens periphery, forming depressions or elevations on the lens' surface, and truncating the lens edge, has been used.

Additionally, dynamic stabilization has been used in which the lens is stabilized by the use of thin zones, or areas in which the thickness of the lens' periphery is reduced. Typically, the thin zones are located at two symmetrically lying regions, one each on the superior and inferior regions of the lens periphery. A disadvantage of dynamic stabilization is that, when a dynamically stabilized lens is first placed on the eye, the lens may take between 10 and 20 minutes to auto-position itself. Thus, a needs exists for improved dynamic stabilization in which auto-positioning is achieved more quickly.

DETAILED DESCRIPTION OF THE INVENTION AND PREFERRED EMBODIMENTS

It is a discovery of the invention that a dynamically stabilized contact lens with improved auto-positioning may be obtained by incorporating certain factors relating to the lens' periphery into the lens' design. More specifically, it is a discovery of the invention that by controlling the lens periphery as to each of thickness differential and both the rate of change from thinner to thicker regions and the shape of the transition from thinner to thicker regions within each of the dual thin zones, a substantial reduction in time for the lens' auto-positioning may be achieved as compared to conventional dynamically stabilized lenses. Additionally, it has been discovered that the dynamically stabilized lenses of the invention maintain their on-eye orientation better as compared to conventionally stabilized lenses.

By "auto-positioning" is meant the automatic rotation of the lens to its target orientation, meaning within 10 degrees of its desired on-eye orientation, that occurs when the lens is placed on-eye. In that the lens wearer is not able to see optimally through the lens until auto-positioning is complete, it is desirable that such positioning is completed as quickly as possible.

The lenses of the present invention incorporate a specific thickness differential. By "thickness differential" is meant the difference in thickness between the thickest and thinnest points of the lens' periphery. Thickness at a given point on the lens is measured in terms of the distance between the front, or object side, surface and back, or eye side, surface of the lens along a direction orthogonal to the back surface. The thickness differential of the lens periphery in the lenses of the invention is about 200 to about 400, preferably about 240 to about 300 $\mu$m.

By "lens periphery" is meant the non-optical portion of the lens that lies adjacent to and surrounds the optic zone. For purposes of the invention, the lens periphery excludes the lens edge, or outermost portion of the lens relative to its geometric center. Typically, the lens edge is about 0.02 mm to about 0.2 mm in width.

Figure 1:
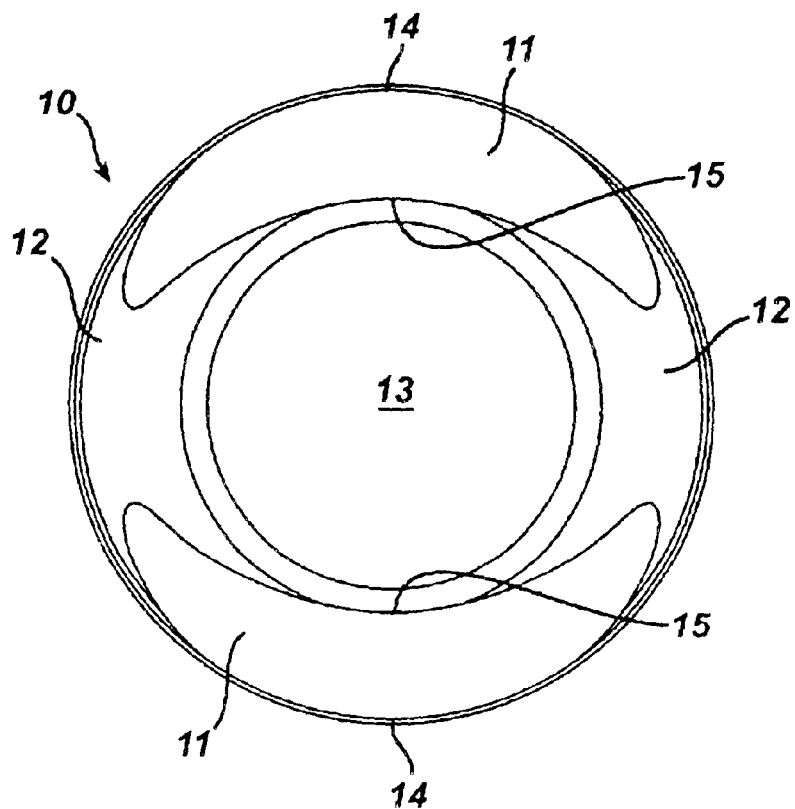
FIG. 1 is a plan view of the front surface of a lens of the invention.

FIG. 1 depicts the front, or object side, surface of a lens of the invention. Lens 10 has an optical zone 13. The lens' periphery surrounds optic zone 13 and is composed of four regions; two thin zones or regions 11 and two thick zones or regions 12. The two thin zones 11 are shown, in which zones the thickness of the lens periphery is reduced as compared to the remainder of the lens periphery or regions 12. The thin zones are located at the superior, or top, and inferior, or bottom portions of the lens periphery, respectively. Preferably, the superior and inferior thin zones are symmetrical about the 90 and 270 degree points, respectively. Additionally shown are two thick regions 12, which regions are the two thickest regions of the lens periphery. These regions lie at opposing ends of the horizontal axis, or 0–180 degree axis and preferably, one region is symmetrical about the 0 degree and one is symmetrical about the 180 degrees point of the lens' periphery.

Each of the thin zones can be viewed as having two points along the y-axis, outermost point 14 along the outermost edge of the thin zone that is farthest from the lens' geometric center and inner-most point 15 along the innermost edge and that is nearest the lens' geometric center. As one moves along the y-axis away from the outermost edge and point 14 inwardly toward the inner-most point 15, there is a continuous increase in the thickness of the thin zone. The change in the thickness as one moves vertically along the y-axis of the thin zone toward the geometric center of the lens may be linear. This thickness change may be represented by the following equation:

$$T = f(y) \tag{I}$$

wherein T is the thickness; and f(y) is a function of the thickness change as one moves along the y-axis.

Alternatively, the thickness change may be accelerated, or non-linear, and according to the equation:

$$T = g(y) \quad \text{(II)}$$

wherein T is the thickness; and g(y) is a function of the thickness change as one moves along the y-axis.

One ordinarily skilled in the art will recognize that, for each of Equations I and II, Cartesian, or polar coordinates may be used. Additionally, it will be recognized that Equations I and II may represent any of a large number of functions. A preferred function for Equation I is:

$$T = T_{max} - (y - y_0)\frac{(T_{max} - T_{min})}{(y_1 - y_0)} \quad \text{(III)}$$

wherein $T_{max}$ is the maximum thickness at $y=y_0$;

$T_{min}$ is the minimum thickness at $y=y_1$;

y is the function variable; and $y_0$ and $y_1$ are points along the y axis.

An alternative preferred function for Equation I, in polar coordinates, is as follows:

$$T = T_{max} - (r - r_o)\frac{(T_{max} - T_{min})}{(r_1 - r_0)} \quad \text{(IV)}$$

wherein $T_{max}$ is the maximum thickness at $r=r_0$;

$T_{min}$ is the minimum thickness at $r=r_1$;

r is the function variable; and $r_0$ and $r_1$ are points along the r axis.

A preferred function for Equation II is:

$$T = T_{min} + T_d \cdot \cos\left[\frac{\pi \cdot (y - y_0)}{2 \cdot (y_1 - y_0)}\right]^\alpha$$

wherein $T_{min}$ is the minimum thickness at $y=y_1$;

($T_{min}+T_d$) is the maximum thickness at $y=y_0$;

α is coefficient that controls the shape of the transition in thickness from $T_{min}$ to ($T_{min}+T_d$); and $y_0$ and $y_1$ are points along the y axis.

Figure 2:
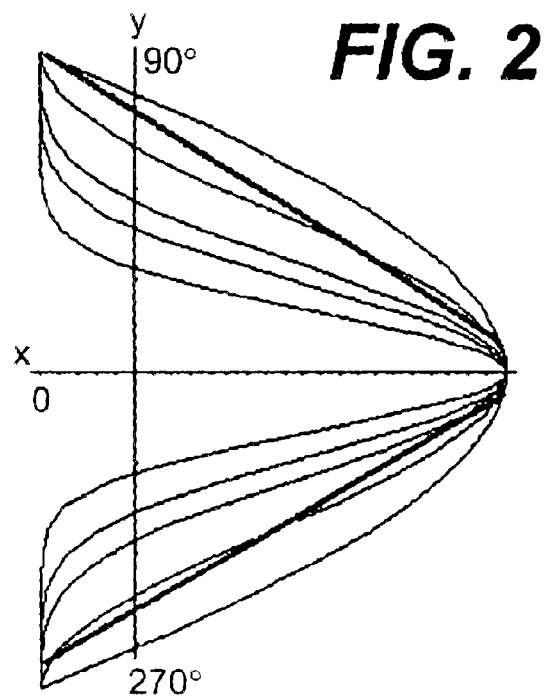
FIG. 2 is a graphical depiction of some of the rates of change in thickness that result from application of each of Equations I and II.

In FIG. 2 is a graphical depiction of the different thickness profiles resulting from application of each of Equations I and II. The y-axis of the graph in FIG. 2 represents the 90–270 degree axis of the lens. The x-axis of the graph is the thickness of the lens along the lens' y-axis. The thickness profiles shown in FIG. 2 are meant only to illustrate some of the possibilities for the shapes that may be imparted to the transition from thin to thick regions of the thin zones of the lenses of the invention.

Figure 3:
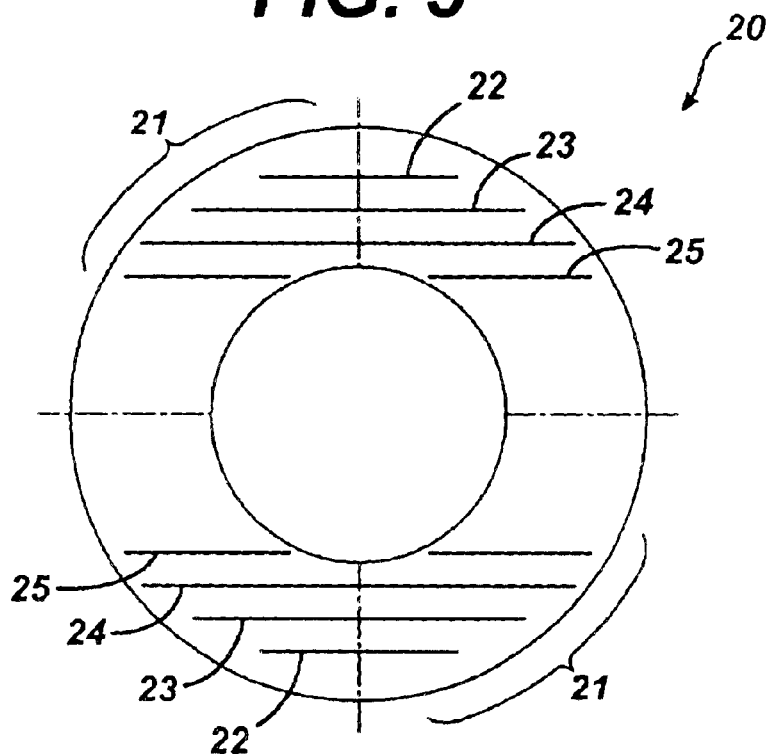
FIG. 3 is a plan view of the front surface of a lens of one embodiment of the lens of the invention.
Figure 4:
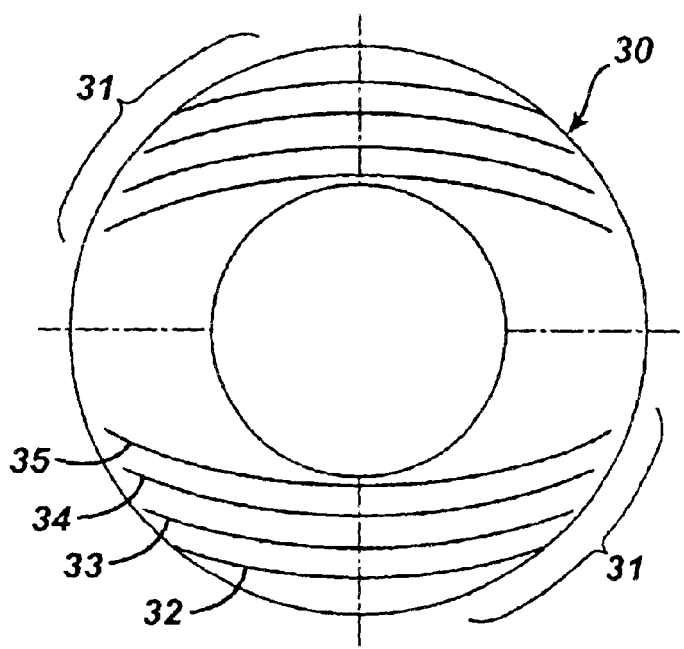
FIG. 4 is a plan view of the front surface of a lens of a second embodiment of the lens of the invention.

By application of Equation I, one may obtain dual thin zones as depicted in FIGS. 3 and 4. FIG. 3 depicts lens 20 with thin zones 21. Each of thin zones 21 is composed of a plurality of horizontally extending iso-thickness lines 22, 23, 24, and 25. By "iso-thickness line" is meant that any point along the line, the thickness is the same as at any other point along the line. The thickness within the thin zone changes continuously as one moves from one iso-thickness line to another increasing in thickness as one moves inwardly from the outermost region of the thin zone toward the innermost region of the thin zone. Thus, outermost iso-thickness line 22 is thinner than 23, which is thinner than 24, which is thinner than 25.

Thus in one embodiment, the invention provides a lens, comprising, consisting essentially of, and consisting of: a first and a second thick zone and a first and second thin zone within the lens periphery; a thickness differential of about 200 to about 400 μm wherein each of the thin zones comprises a plurality of horizontally extending iso-thickness lines extending from an outermost edge to an innermost edge of the thin zone, each line having a thickness that is different from each other line and wherein in each of the thin zones, the thickness linearly increases from outermost line to innermost line.

In FIG. 4 is depicted an alternative embodiment for the constant rate of change. FIG. 4 depicts lens 30 with thin zones 31. Each of the thin zones is composed of a number of horizontally extending iso-thickness arcs 32, 33, 34, and to 35. By "iso-thickness arc" is meant an arc-shaped line wherein for any point along the arc the thickness is the same as at any other point along the arc. The thickness of outermost iso-thickness arc 32 is less than that of 33, which is less than that of 34, which is less than that of innermost arc 35.

In another embodiment, the lens of the invention comprises, consists essentially of, and consists of: a first and a second thick zone and a first and second thin zone within the lens periphery; a thickness differential of about 200 to about 400 μm wherein each of the thin zones comprises a plurality of horizontally extending iso-thickness arcs extending from an outermost edge to an innermost edge of the thin zone, each arc having a thickness that is different from each other arc and wherein in each of the thin zones, the thickness linearly increases from outermost arc to innermost arc.

Figure 5:
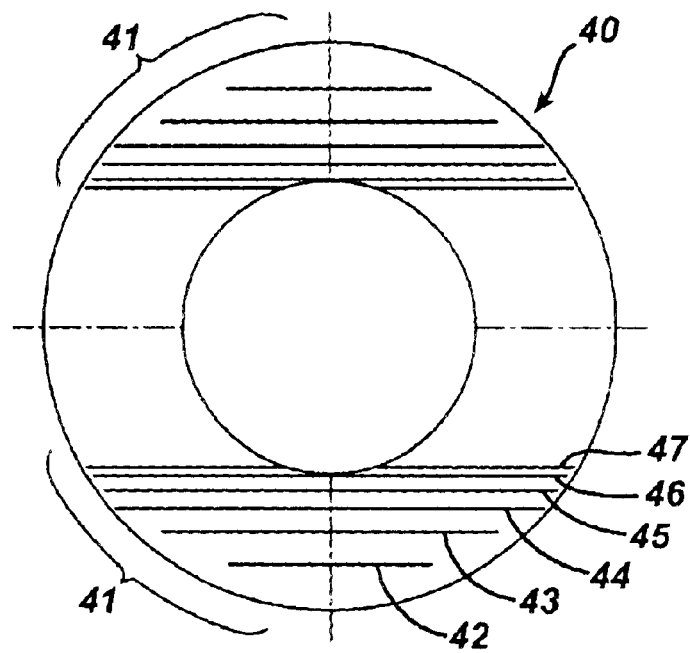
FIG. 5 is a plan view of the front surface of a lens of a third embodiment of the lens of the invention.
Figure 6:
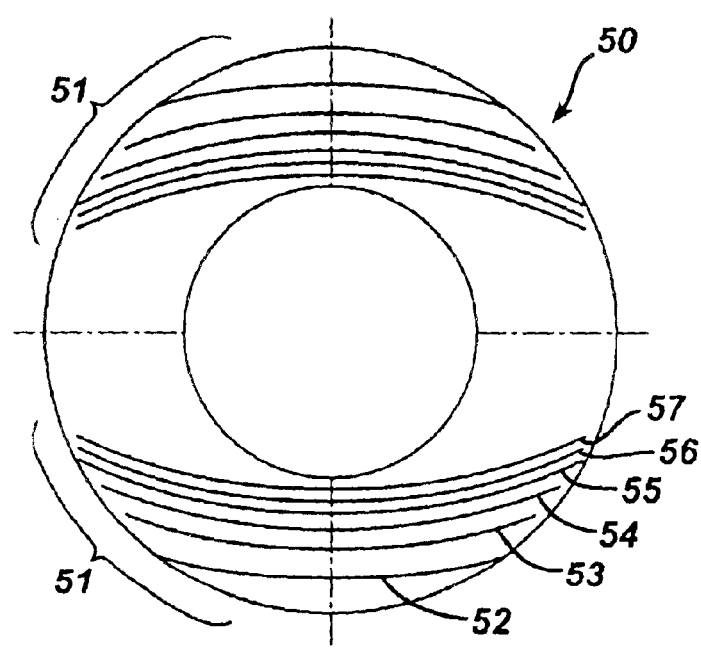
FIG. 6 is a plan view of the front surface of a lens of a fourth embodiment of the lens of the invention.

FIGS. 5 and 6 depict dual thin zones obtained by application of Equation II in which the change in thickness as one moves inwardly from the outermost iso-thickness line is non-linear. FIG. 5 depicts lens 40 with thin zones 41. Each of the thin zones is composed of a plurality of iso-thickness lines 42, 43, 44, 45 and 46 each of which is of a different thickness, with thickness increasing as one moves from outermost line 42 to 43 and so forth. The thickness at any point along the horizontal, or x-axis, of each of the lines is the same as at any other point, the thickness changing only as one moves from line to line. In FIG. 6 is depicted an alternative embodiment for the non-linear rate of thickness change in which iso-thickness arcs, rather than iso-thickness lines, are used.

In yet another embodiment, the invention provides a lens comprising, consisting essentially of, and consisting of: a first and a second thick zone and a first and second thin zone within the lens periphery; a thickness differential of about 200 to about 400 μm wherein each of the thin zones comprises a plurality of horizontally extending iso-thickness lines extending from an outermost edge to an innermost edge of the thin zone, each line having a thickness that is different from each other line and wherein in each of the thin zones, the thickness non-linearly increases from outermost line to innermost line.

In still another embodiment, the invention provides a lens, comprising, consisting essentially of, and consisting of a first and a second thick zone and a first and second thin zone within the lens periphery; a thickness differential of about 200 to about 400 μm wherein each of the thin zones comprises a plurality of horizontally extending iso-thickness arcs extending from an outermost edge to an innermost edge of the thin zone, each arc having a thickness that is different from each other arc and wherein in each of the thin zones, the thickness non-linearly increases from outermost arc to innermost arc.

The invention may be used to stabilize any lens, but may find its greatest utility in lenses that require on-eye stabilization to provide optical correction. Thus, the invention may find its greatest utility in toric and multifocal lenses. Additionally, the designs may be useful in lenses customized to a specific individual's corneal topography, lenses incorporating high order wave-front aberration correction, or both. Preferably, the invention is used to stabilize toric lenses or toric multifocal lenses as, for example, disclosed in U.S. Pat. Nos. 5,652,638, 5,805,260 and 6,183,082 which are incorporated herein by reference in their entireties.

Multifocal lenses include, without limitation, bifocal and progressive lenses. One type of bifocal lens provides an optic zone with annular rings alternating between near and distance optical power. By "near optical power" is meant the amount of refractive power required to correct the wearer's near vision acuity to the desired degree. By "distance optical power" is meant the amount of refractive power required to correct the wearer's distance vision acuity to the desired degree.

The annular rings may be present on the front, or object side, surface, the back, or eye side, surface, or both surfaces of the lens. In a preferred embodiment, a first and a second ophthalmic lens is provided, the first lens having a convex surface with an optic zone that provides substantially all of the distance optical power and a concave surface with an optic zone of with at least two concentric, annular portions, the power of each of the at least two annular portions substantially equal to that of the distance optical power. The second lens provides a convex surface having an optic zone that provides substantially all of the near optical power and a concave surface that provides an optic zone of at least two concentric, annular portions, the power of each of the at least two annular portions substantially equal to that of the near optical power.

Alternatively, rings of intermediate power, or power between that of the near and distance optical power may also be provided. As yet another alternative, the lens may provide progressive multifocal correction. Suitable bifocal, multifocal and progressive designs are described in U.S. Pat. Nos. 5,448,312, 5,485,228, 5715,031, 5,929,969, 6,179,420, 6,511,178 and 6,520,638 incorporated herein by reference in their entireties.

As yet another alternative, the lenses of the invention may incorporate correction for higher order ocular aberrations, corneal topographic data, or both. Examples of such lenses are found in U.S. Pat. Nos. 6,305,802 and 6,554,425 incorporated herein by reference in their entireties.

The lenses of the invention may be made from any suitable lens forming materials for manufacturing ophthalmic lenses including, without limitation, spectacle, contact, and intraocular lenses. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred contact lens material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Ser. No. 60/363,630 incorporated herein in its entirety by reference.

Curing of the lens material may be carried out by any convenient method. For example, the material may be deposited within a mold and cured by thermal, irradiation, chemical, electromagnetic radiation curing and the like and combinations thereof. Preferably, for contact lens embodiments, molding is carried out using ultraviolet light or using the full spectrum of visible light. More specifically, the precise conditions suitable for curing the lens material will depend on the material selected and the lens to be formed. Suitable processes are disclosed in U.S. Pat. No. 5,540,410 incorporated herein in its entirety by reference.

The contact lenses of the invention may be produced by any convenient method. One such method uses an OPTO-FORM™ lathe with a VARIFORM™ attachment to produce mold inserts. The mold inserts in turn are used to form molds. Subsequently, a suitable liquid resin is placed between the molds followed by compression and curing of the resin to form the lenses of the invention. One ordinarily skilled in the art will recognize that any number of known methods may be used to produce the lenses of the invention.

The invention will be clarified by a consideration of the following, non-limiting examples.

EXAMPLE

Example 1

Two different lenses of the invention, Lens A and Lens B were tested on-eye for auto-positioning versus ACUVUE® Brand Toric lenses. Lenses A and B were made using Equation III For Lens A, $T_{max}$ was 0.418 mm and $T_{min}$ was 0.150 mm. For Lens B, $T_{max}$ was 0.409 mm and $T_{min}$ was 0.145 mm. For ACUVUE Toric, 496 and 606 eyes were tested for 3 minute and 20 minute testing, respectively. For Lens A, 178 and 188 eyes were tested, respectively. For Lens B, 108 eyes were used to test at both times. All lenses were hydrogel lenses made from etafilcon A.

The lenses were randomly inserted into the subject eyes without consideration for rotational position. Auto-positioning was measured using a slit lamp biomicroscope and scale. Table 1 shows the percentage of eyes that displayed auto-positioning within 0 to 10 degrees of the optimal lens position within 3 minutes following placement of the lens on eye. Table 2 shows the percentage of eyes displaying auto-positioning within 0 to 10 degrees after approximately 20 minutes following placement on eye.

TABLE 1

| Lens | 0–10 Degrees |
| --- | --- |
| ACUVUE BRAND TORIC | 70% |
| Lens A | 81% |
| Lens B | 79% |

TABLE 2

| Lens | 0–10 Degrees |
| --- | --- |
| ACUVUE BRAND TORIC | 70% |
| Lens A | 82% |
| Lens B | 81% |

The results of the testing demonstrate that the speed to auto-positioning is significantly better for Lenses A and B than for the ACUVUE lens.

Example 2

Two commercially available toric lenses, Cooper Vision ENCORE™ Toric and Ocular Sciences Inc. BIOMEDICS™ 55 Toric were tested along with Lens A using an USCAN RK 726PCI eye-track monitoring device The eyes of 10 subjects were tracked at continuously over a 40 minute period and analyzed for lens placement at 17 different time points (0.5, 1, 2, 3, 4, 5, 10, 15, 20, 25, 30, 35, 36, 37, 38, 39 and 40 minutes). Significantly less rotation from the 0 point for Lens A was observed as compared to the commercial lenses. Additionally, significantly less variation, once the lenses were auto-positioned, was observed for Lens A as compared to the commercial lenses. The results demonstrate that Lens A maintained on-eye orientation better as compared to the conventional lenses.

What is claimed is:

1. A lens, comprising:
a first and a second thick zone and a first and second thin zone within the lens periphery;
a thickness differential of about 200 to about 400 μm wherein each of the thin zones comprises a plurality of horizontally extending iso-thickness lines extending from an outermost edge to an innermost edge of the thin zone, each line having a thickness that is different from each other line and wherein in each of the thin zones, the thickness linearly increases from outermost line to innermost line.

2. A lens, comprising:
a first and a second thick zone and a first and second thin zone within the lens periphery;
a thickness differential of about 200 to about 400 μm wherein each of the thin zones comprises a plurality of horizontally extending iso-thickness arcs extending from an outermost edge to an innermost edge of the thin zone, each arc having a thickness that is different from each other arc and wherein in each of the thin zones, the thickness linearly increases from outermost arc to innermost arc.

3. A lens, comprising:
a first and a second thick zone and a first and second thin zone within the lens periphery;
a thickness differential of about 200 to about 400 μm wherein each of the thin zones comprises a plurality of horizontally extending iso-thickness lines extending from an outermost edge to an innermost edge of the thin zone, each line having a thickness that is different from each other line and wherein in each of the thin zones, the thickness non-linearly increases from outermost line to innermost line.

4. A lens, comprising:
a first and a second thick zone and a first and second thin zone within the lens periphery;
a thickness differential of about 200 to about 400 μm wherein each of the thin zones comprises a plurality of horizontally extending iso-thickness arcs extending from an outermost edge to an innermost edge of the thin zone, each arc having a thickness that is different from each other arc and wherein in each of the thin zones, the thickness non-linearly increases from outermost arc to innermost arc.

5. The lens of claim 1, wherein the first thin zone is symmetrical about the 90 degree point on the lens periphery and the second thin zone is symmetrical about the 270 degree point on the lens periphery.

6. The lens of claim 2, wherein the first thin zone is symmetrical about the 90 degree point on the lens periphery and the second thin zone is symmetrical about the 270 degree point on the lens periphery.

7. The lens of claim 3, wherein the first thin zone is symmetrical about the 90 degree point on the lens periphery and the second thin zone is symmetrical about the 270 degree point on the lens periphery.

8. The lens of claim 4, wherein the first thin zone is symmetrical about the 90 degree point on the lens periphery and the second thin zone is symmetrical about the 270 degree point on the lens periphery.

9. The lens of claim 5, wherein the first thick zone is symmetrical about the 0 degree point on the lens periphery and the second thick zone is symmetrical about the 180 degree point on the lens periphery.

10. The lens of claim 6, wherein the first thick zone is symmetrical about the 0 degree point on the lens periphery and the second thick zone is symmetrical about the 180 degree point on the lens periphery.

11. The lens of claim 7, wherein the first thick zone is symmetrical about the 0 degree point on the lens periphery and the second thick zone is symmetrical about the 180 degree point on the lens periphery.

12. The lens of claim 8, wherein the first thick zone is symmetrical about the 0 degree point on the lens periphery and the second thick zone is symmetrical about the 180 degree point on the lens periphery.

13. The lens of claim 1, 2, 5, 6, 9, or 10, wherein the thin zones are designed according to the equation:

$$T = T_{\max} - (y - y_0) \frac{(T_{\max} - T_{\min})}{(y_1 - y_0)}$$

wherein $T_{max}$ is a maximum thickness at $y=y_0$;
$T_{min}$ is a minimum thickness at $y=y_1$;
y is a function variable; and
$y_0$ and $y_1$ each are points along a y axis.

14. The lens of claim 1, 2, 5, 6, 9, or 10, wherein the thin zones are designed according to the equation:

$$T = T_{\max} - (r - r_o) \frac{(T_{\max} - T_{\min})}{(r_1 - r_0)}$$

wherein $T_{max}$ is a maximum thickness at $r=r_0$;
$T_{min}$ is a minimum thickness at $r=r_1$;
r is a function variable; and
$r_0$ and $r_1$ are each points along an r-axis.

15. The lens of claim 3, 4, 7, 8, 11, or 12, wherein the thin zones are designed according to the equation:

$$T = T_{\min} + T_d \cdot \cos\left[\frac{\pi \cdot (y - y_0)}{2 \cdot (y_1 - y_0)}\right]^\alpha$$

wherein $T_{min}$ is the minimum thickness at $y=y_1$;
$(T_{min}+T_d)$ is the maximum thickness at $y=y_0$;
α is coefficient that controls the shape of the transition in thickness from $T_{min}$ to $(T_{min}+T_d)$;
y is a function variable; and
$y_0$ and $y_1$ are points along a y axis.

16. The lens of claim 1, 2, 5, 6, 9, or 10 wherein the lens is a toric contact lens.

17. The lens of claim 1, 2, 5, 6, 9, or 10 wherein the lens is a bifocal contact lens.

18. The lens of claim 1, 2, 5, 6, 9, or 10 wherein the lens is a progressive multifocal contact lens.

19. The lens of claim 3, 4, 7, 8, 11, or 12 wherein the lens is a toric contact lens.

20. The lens of claim 3, 4, 7, 8, 11, or 12 wherein the lens is a bifocal contact lens.

21. The lens of claim 3, 4, 7, 8, 11, or 12 wherein the lens is a progressive multifocal contact lens.

22. A method for producing contact lenses comprising the step of designing a lens comprising:
   a first and a second thick zone and a first and second thin zone within the lens periphery;
   a thickness differential of about 200 to about 400 $\mu$m wherein each of the thin zones comprises a plurality of horizontally extending iso-thickness lines extending from an outermost edge to an innermost edge of the thin zone, each line having a thickness that is different from each other line and wherein in each of the thin zones, the thickness linearly increases from outermost line to innermost line.

23. A method for producing contact lenses comprising the step of designing a lens, comprising:
   a first and a second thick zone and a first and second thin zone within the lens periphery;
   a thickness differential of about 200 to about 400 $\mu$m wherein each of the thin zones comprises a plurality of horizontally extending iso-thickness arcs extending from an outermost edge to an innermost edge of the thin zone, each arc having a thickness that is different from each other arc and wherein in each of the thin zones, the thickness linearly increases from outermost arc to innermost arc.

24. A method for producing contact lenses comprising the step of designing a lens, comprising:
   a first and a second thick zone and a first and second thin zone within the lens periphery;
   a thickness differential of about 200 to about 400 $\mu$m wherein each of the thin zones comprises a plurality of horizontally extending iso-thickness lines extending from an outermost edge to an innermost edge of the thin zone, each line having a thickness that is different from each other line and wherein in each of the thin zones, the thickness non-linearly increases from outermost line to innermost line.

25. A method for producing contact lenses comprising the step of designing a lens, comprising:
   a first and a second thick zone and a first and second thin zone within the lens periphery;
   a thickness differential of about 200 to about 400 $\mu$m wherein each of the thin zones comprises a plurality of horizontally extending iso-thickness arcs extending from an outermost edge to an innermost edge of the thin zone, each arc having a thickness that is different from each other arc and wherein in each of the thin zones, the thickness non-linearly increases from outermost arc to innermost arc.

* * * * *